US010690088B2

(12) United States Patent
Ridray et al.

(10) Patent No.: US 10,690,088 B2
(45) Date of Patent: Jun. 23, 2020

(54) JET ENGINE COMPRISING A NACELLE EQUIPPED WITH REVERSER FLAPS

(71) Applicant: Airbus Operations (S.A.S.), Toulouse (FR)

(72) Inventors: Frédéric Ridray, L'isle Jourdain (FR); Lionel Czapla, Cornebarrieu (FR); Frédéric Piard, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 280 days.

(21) Appl. No.: 15/926,757

(22) Filed: Mar. 20, 2018

(65) Prior Publication Data

US 2018/0274484 A1 Sep. 27, 2018

(30) Foreign Application Priority Data

Mar. 23, 2017 (FR) ..................................... 17 52385

(51) Int. Cl.
*F02K 1/72* (2006.01)
*F02K 1/76* (2006.01)

(52) U.S. Cl.
CPC ................ *F02K 1/72* (2013.01); *F02K 1/763* (2013.01); *F05D 2250/34* (2013.01); *F05D 2270/66* (2013.01); *Y02T 50/671* (2013.01)

(58) Field of Classification Search
CPC ..... F02K 1/70; F02K 1/72; F02K 1/62; F02K 1/625; F02K 1/763
See application file for complete search history.

(56) References Cited

U.S. PATENT DOCUMENTS 3,815,357 A 6/1974 Brennan
3,829,020 A * 8/1974 Stearns ..................... F02K 1/09 239/265.13

(Continued)

FOREIGN PATENT DOCUMENTS

EP 3034848 A1 6/2016
EP 3 103 995 A2 12/2016

(Continued)

OTHER PUBLICATIONS

French Search Report for French Application for No. 1752385 dated Dec. 1, 2017.

(Continued)

*Primary Examiner* — Andrew H Nguyen
(74) *Attorney, Agent, or Firm* — Jenkins, Wilson, Taylor & Hunt, P.A.

(57) ABSTRACT

A turbofan including a motor with a fan casing and a nacelle which includes a mobile cowl and a main slider bearing gratings and being mobile in translation between an advanced position and a retracted position in which the mobile cowl and the fan casing define, between them, a window. The nacelle also includes reverser flaps, each one being mounted articulated on the main slider between a closed position in which it obstructs the window and an open position in which it does not obstruct the window, a secondary slider mounted mobile in translation on the main slider between a first position and a second position, a transmission system configured to make each reverser flap pass from the closed position to the open position when the secondary slider passes from the first position to the second position, and a set of actuators that bring about a movement in translation of the main slider, and of the secondary slider.

4 Claims, 4 Drawing Sheets

(56) References Cited

U.S. PATENT DOCUMENTS

| | | | | |
|---|---|---|---|---|
| 8,720,818 | B1 | 5/2014 | Teulou et al. | |
| 8,793,973 | B2 | 8/2014 | Vauchel | |
| 9,856,825 | B2 | 1/2018 | Gallet | |
| 2012/0138707 | A1 * | 6/2012 | Vauchel | F02K 1/72 239/265.29 |
| 2016/0131082 | A1 * | 5/2016 | Gormley | F02K 1/766 239/265.19 |
| 2016/0363097 | A1 * | 12/2016 | Foutch | F02K 1/72 |
| 2018/0372025 | A1 | 12/2018 | Ridray et al. | |

FOREIGN PATENT DOCUMENTS

| | | | |
|---|---|---|---|
| EP | 3103955 | A2 | 12/2016 |
| EP | 3 165 752 | A2 | 5/2017 |
| FR | 2 935 444 | A1 | 3/2010 |
| FR | 2 946 094 | A1 | 12/2010 |
| FR | 2946094 | | 12/2010 |
| WO | WO 2013/021136 | A1 | 2/2013 |

OTHER PUBLICATIONS

French Search Report for French Application No. 1755332 dated Feb. 19, 2018.

* cited by examiner

JET ENGINE COMPRISING A NACELLE EQUIPPED WITH REVERSER FLAPS

CROSS-REFERENCE TO RELATED APPLICATION

This patent application claims priority to French patent application FR 17 52385, filed on Mar. 23, 2017, the entire disclosure of which is incorporated by reference herein.

TECHNICAL FIELD

The present disclosure relates to a turbofan which comprises a nacelle equipped with a plurality of reverser flaps, and to an aircraft comprising at least one such turbofan.

BACKGROUND

An aircraft includes a fuselage to each side of which is fixed a wing. Under each wing is suspended at least one turbofan. Each turbofan is fixed under the wing by a pylon that is fixed between the structure of the wing and the structure of the turbofan. The turbofan comprises a motor and a nacelle that is fixed around the motor.

The nacelle comprises a plurality of reverser flaps, each one being mobile between a closed position in which it becomes continuous with the exterior surface of the nacelle and an open position in which it opens a window in the wall of the nacelle to expel the air of the bypass flow to the outside.

The reverser flap is mounted mobile in rotation on the structure of the nacelle so as to pass from a closed position in which the reverser flap does not obstruct the bypass flow duct to an open position in which the reverser flap obstructs the duct. Accordingly, in the open position, the reverser flap deflects a part of the bypass flow to the outside via the window. The movement of each reverser flap is controlled by one or more actuators, which are relatively heavy.

Although the mechanism of a reverser flap of this kind is satisfactory, it is desirable to find different mechanisms.

SUMMARY

The present disclosure has an object of proposing a turbofan comprising a nacelle equipped with a plurality of reverser flaps with a different opening mechanism.

To that end, the disclosure herein proposes a turbofan comprising a motor and a nacelle, surrounding the motor, which comprises a fan casing, in which a duct for a bypass flow is delimited, disposed or defined between the nacelle and the motor, the nacelle comprising:

- a fixed structure attached to the fan casing;
- a mobile assembly having a mobile cowl and a main slider bearing gratings, the mobile cowl being fixed to and downstream of the main slider, the main slider being mobile in translation, on the fixed structure, in a direction of translation between an advanced position in which the main slider is positioned such that the mobile cowl is moved close to the fan casing and a retracted position in which the main slider is positioned such that the mobile cowl is moved away from the fan casing so as to define, between them, an open window between a duct for a bypass flow and the outside of the nacelle, through one of the gratings and;
- a plurality of reverser flaps, each one being mounted articulated on the main slider between a closed position in which it obstructs a zone of the window and an open position in which it does not obstruct the zone of the window;
- a secondary slider mounted mobile in translation parallel to the direction of translation on the main slider between a first position and a second position;
- a transmission system configured to make each reverser flap pass from the closed position to the open position when the secondary slider passes from the first position to the second position and vice versa; and
- a set of actuators configured to bring about, from the advanced and closed position, a movement in translation of the main slider to the retracted position, and then the movement in translation of the secondary slider from the first position to the second position and vice versa.

A jet engine of this kind makes it possible, inter alia, to reduce the number of actuators used for actuating the reverser flaps.

Advantageously, in the retracted position, the main slider is pressed against the fixed structure of the nacelle.

Advantageously, the main slider has stops that are angularly distributed around the perimeter of the main slider, and, for each stop, the fan casing has a counter-stop against which the stop comes to abut in the retracted position.

The disclosure herein also proposes an aircraft comprising at least one turbofan in accordance with one of the above variants.

BRIEF DESCRIPTION OF THE DRAWINGS

The features of the disclosure herein mentioned above, along with others, will become more clearly apparent on reading the following description of one exemplary embodiment, the description being given with reference to the appended, example drawings, in which.

DETAILED DESCRIPTION

Figure 1:
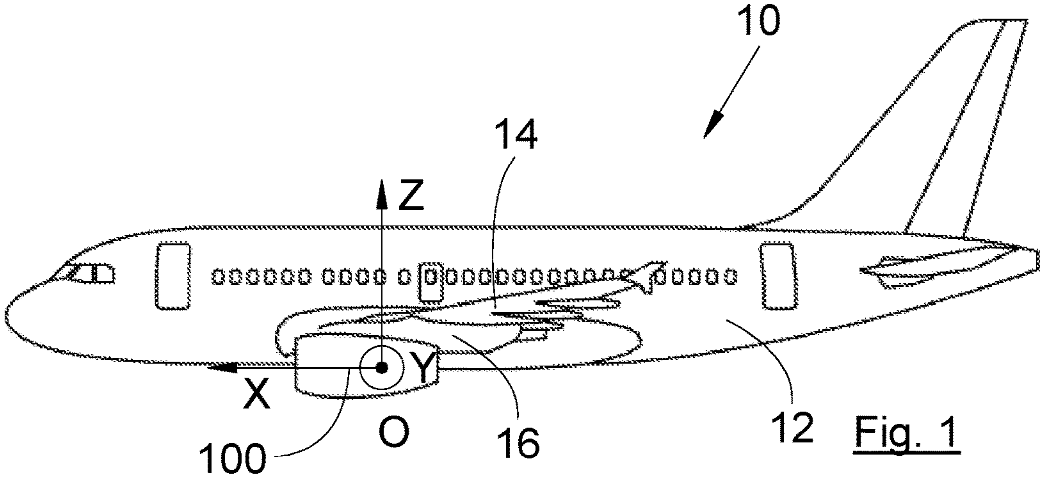
FIG. 1 is a side view of an aircraft comprising a jet engine according to the disclosure herein.

In the following description, terms relating to a position are provided in relation to an aircraft in a forward movement position as shown in FIG. 1.

FIG. 1 shows an aircraft 10 that comprises a fuselage 12, to each side of which is fixed a wing 14 that bears at least one turbofan 100 according to the disclosure herein. The turbofan 100 is fixed under the wing 14 by a pylon 16.

Figure 2:
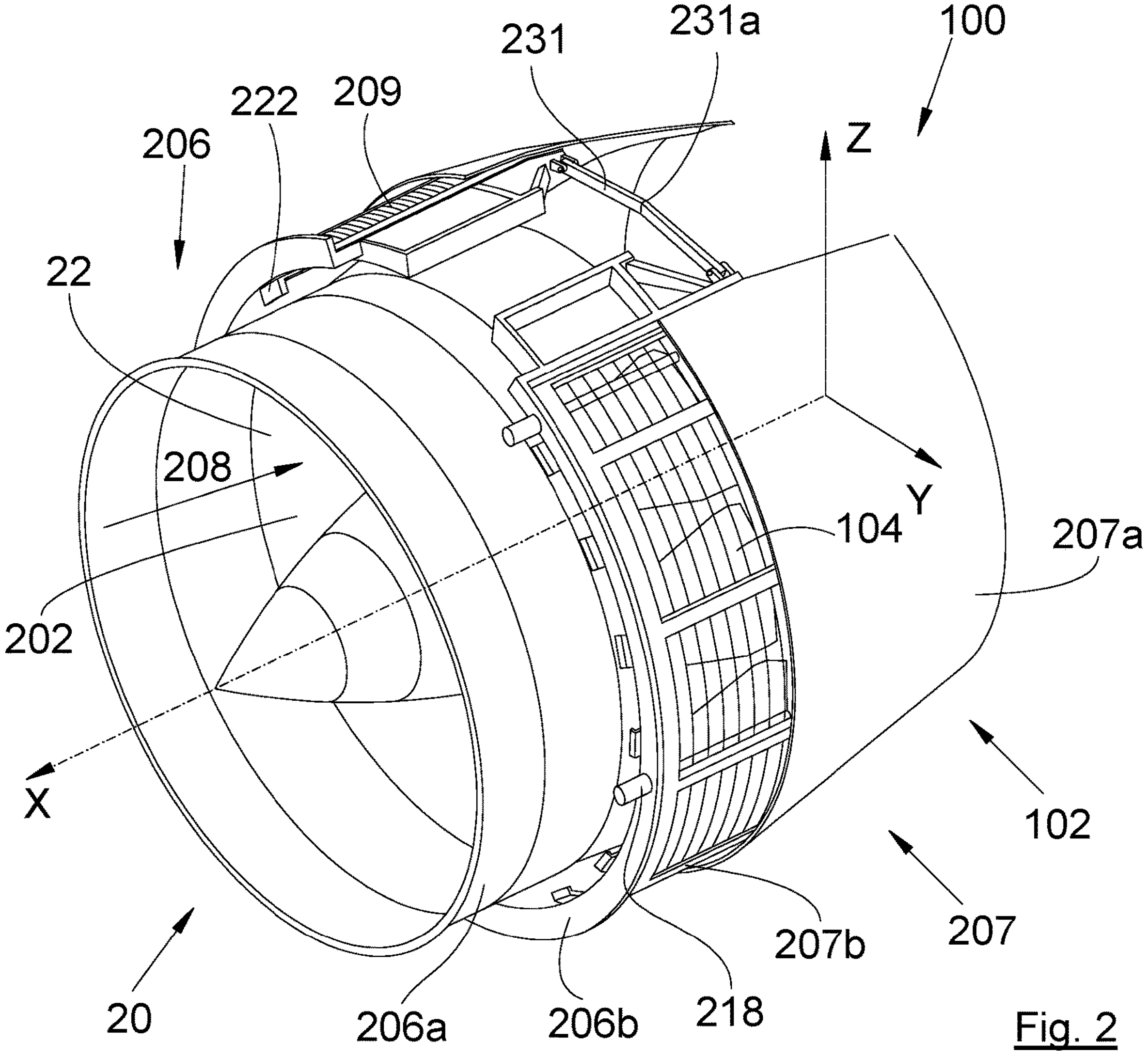
FIG. 2 is a perspective view of the jet engine according to the disclosure herein.

FIG. 2 shows the turbofan 100 which has a nacelle 102 and a motor 20 which is housed inside the nacelle 102 and comprises a fan casing 206*a*. In this case, the motor 20 is represented by its front cone and its fan 22 inside the air intake of the nacelle 102.

In the following description, and by convention, X denotes the longitudinal axis of the turbofan 100 that is parallel to the longitudinal or roll axis of the aircraft 10 oriented positively in the direction of forward movement of the aircraft 10, Y denotes the transverse axis parallel to the pitch axis of the aircraft which is horizontal when the aircraft is on the ground, and Z denotes the vertical axis parallel to the yaw axis when the aircraft is on the ground, these three directions X, Y and Z being mutually orthogonal and forming an orthonormal frame of reference the origin of which is the centre of gravity of the turbofan 100.

Figure 4:
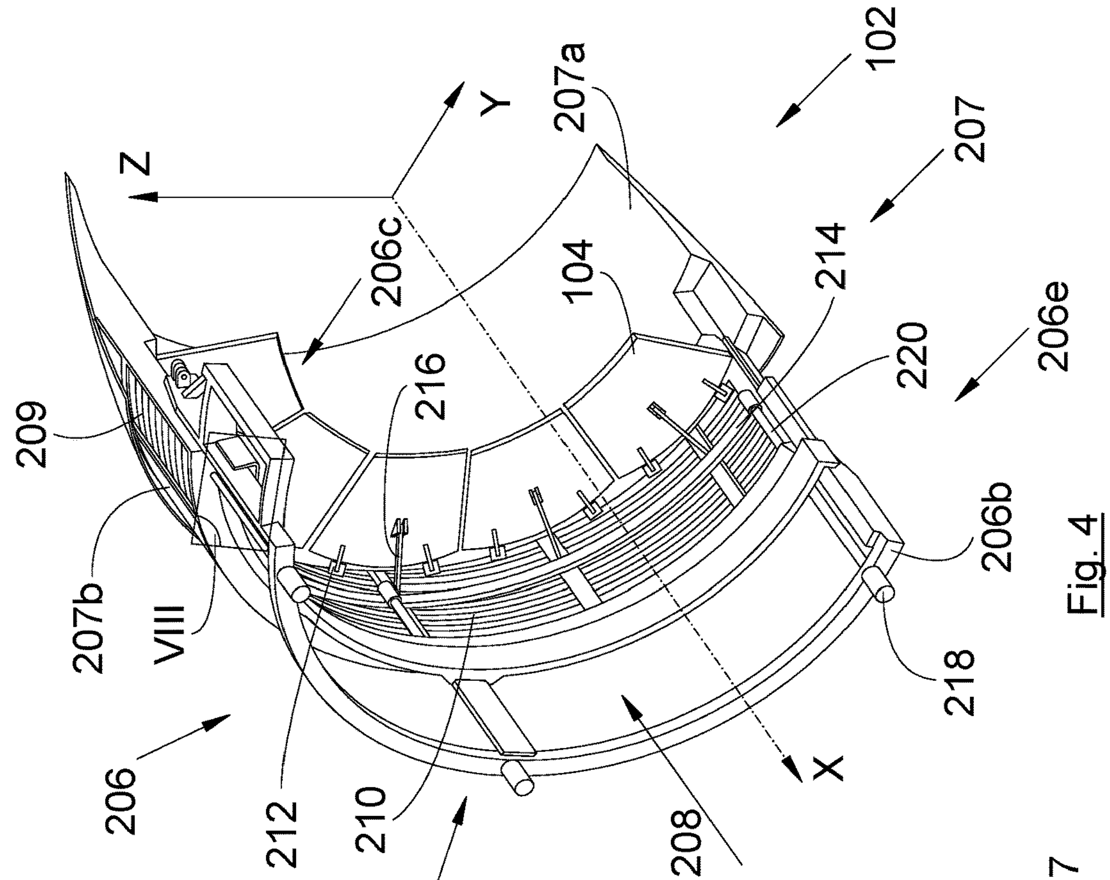
FIG. 4 is a perspective view identical to that of FIG. 3 in the retracted and open position.
Figure 3:
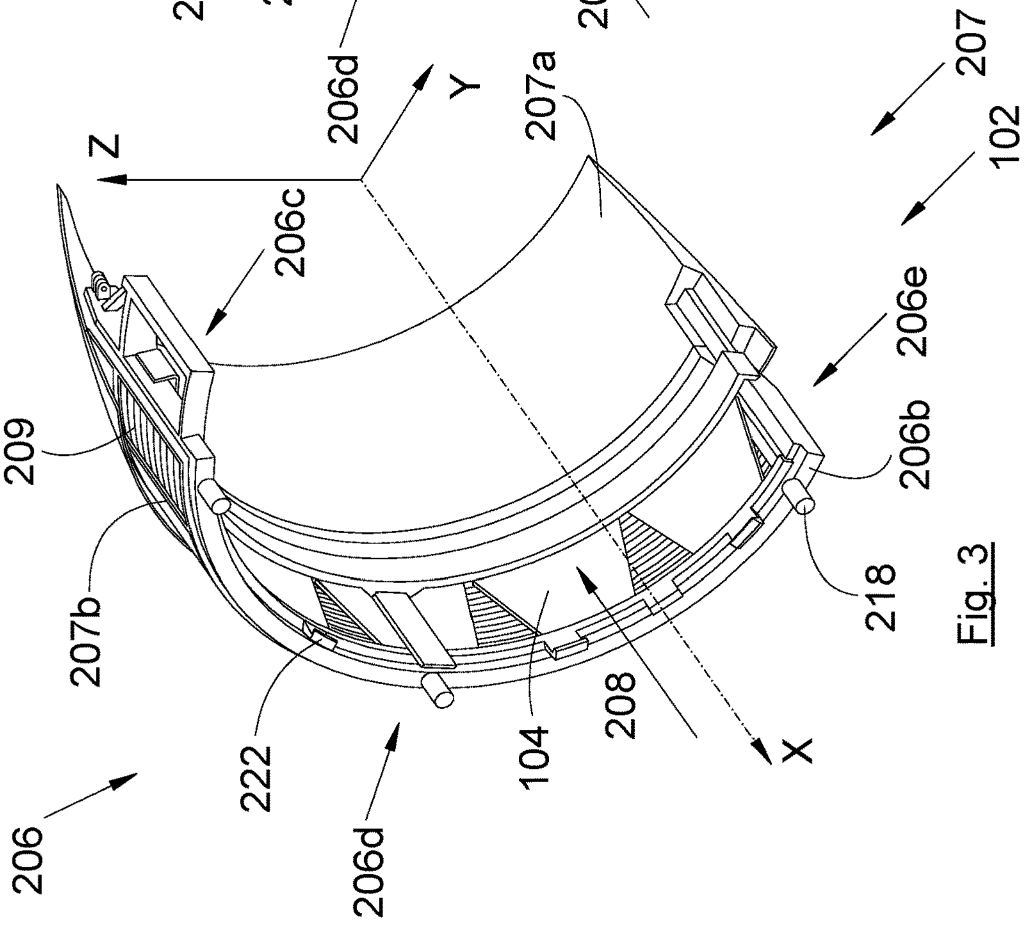
FIG. 3 is a perspective view of a section through a nacelle according to the disclosure herein in the advanced position.
Figure 5:
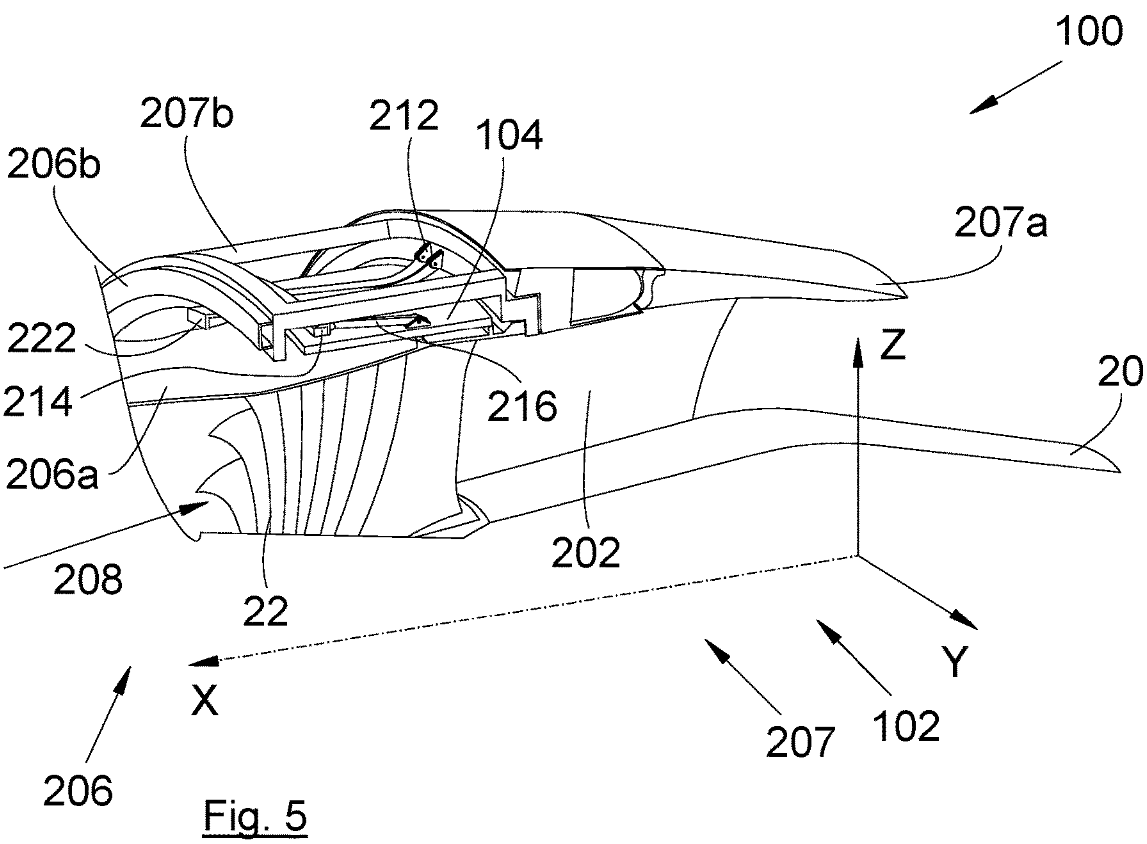
FIG. 5 is a perspective view of a section through the engine in the advanced position.
Figure 6:
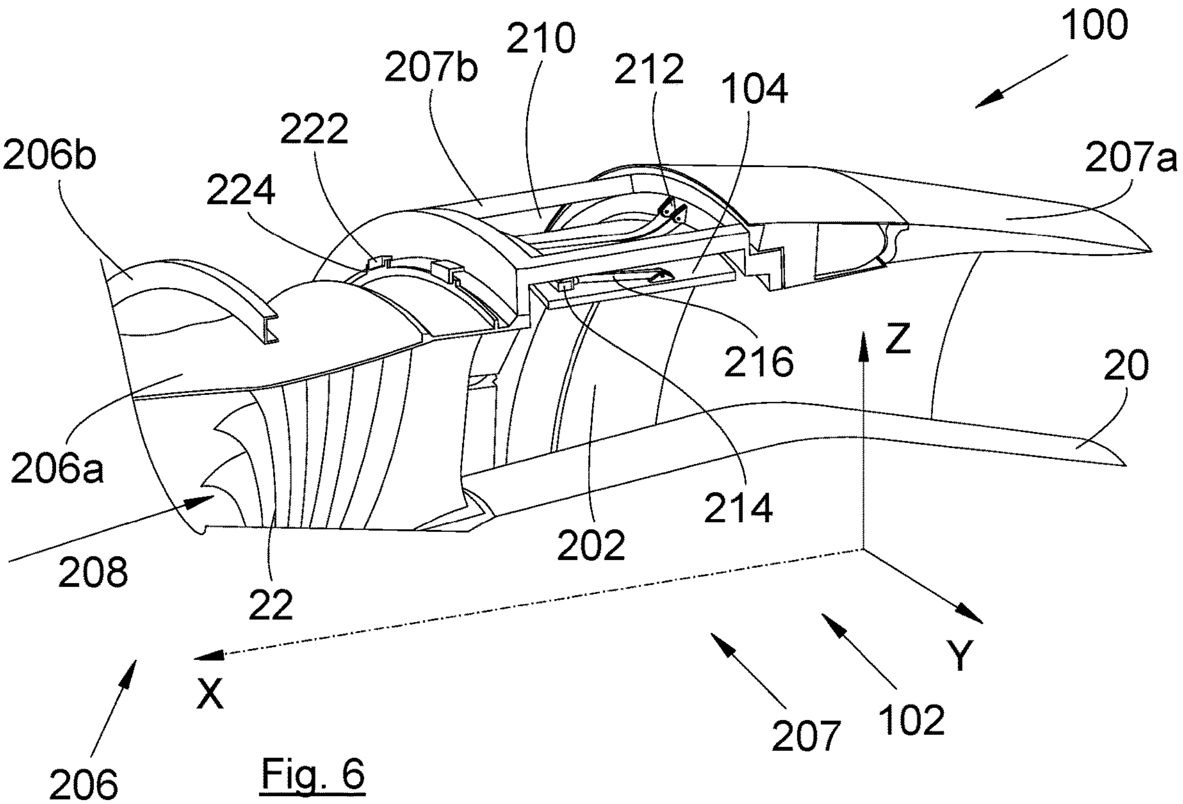
FIG. 6 is a perspective view identical to that of FIG. 5 in the retracted and closed position.
Figure 7:
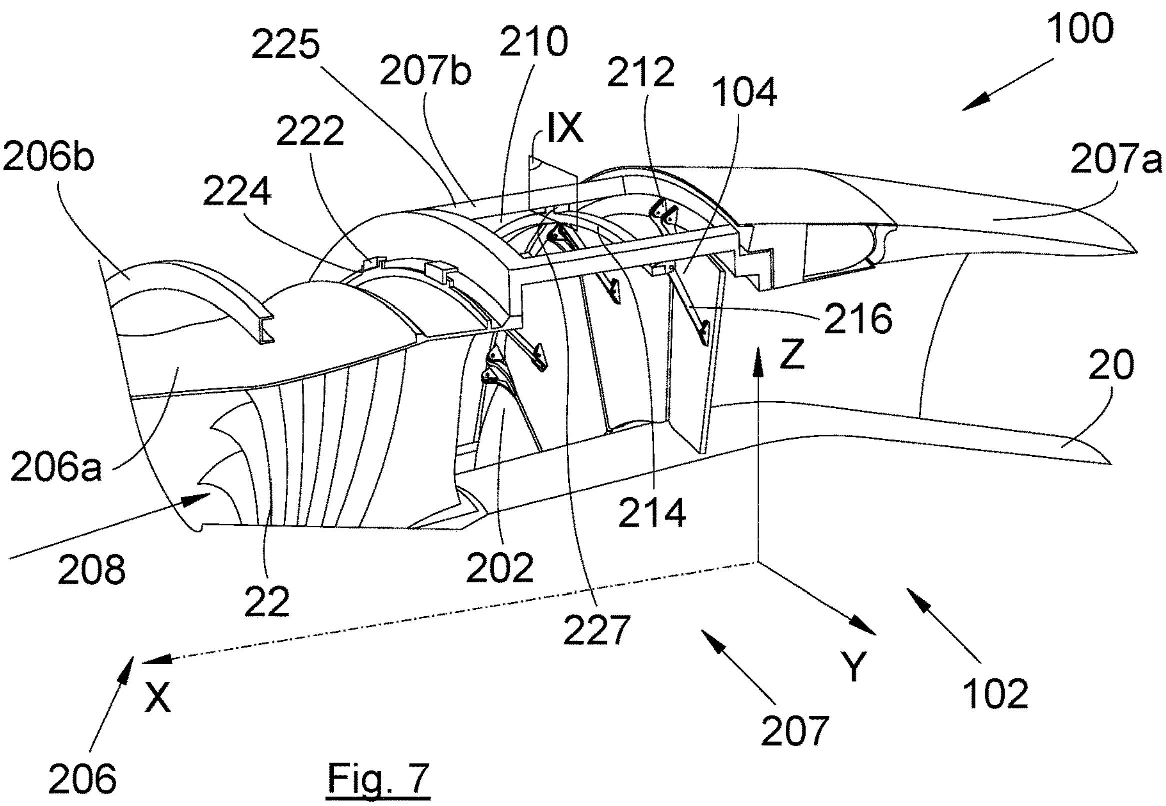
FIG. 7 is a perspective view identical to that of FIG. 5 in the retracted and open position.

FIG. 3 and FIG. 4 show part of the nacelle 102, and FIGS. 5 through 7 show part of the turbofan 100.

As shown in FIGS. 5 through 7, the turbofan 100 has, between the nacelle 102 and the motor 20, a duct 202 in which flows the bypass flow 208 coming from the air intake and through the fan 22.

The nacelle 102 has a fixed structure 206 that is mounted fixed on the fan casing 206*a*. The fixed structure 206 consists of a front frame 206*b* mounted around the fan casing 206*a*. The front frame 206*b* is connected to the fan casing 206*a* by the 6 o'clock beam 206*e*, the 9 o'clock beam 206*d* and the 12 o'clock beam 206*c*. The front frame 206*b*, as well as the 6 o'clock beam 206*e*, the 9 o'clock beam 206*d* and the 12 o'clock beam 206*c*, can be integral parts of the fixed structure 206 of the nacelle 102.

The fixed structure 206 of the nacelle 102 is configured to be fixed only to the fan casing 206*a*. More particularly, the nacelle 102 is fixed to the fan casing 206*a* by the intermediary of the 6 o'clock beams 206*e*, the 9 o'clock beam 206*d* and the 12 o'clock beam 206*c*.

The crosspiece 231 located at 12 o'clock makes it possible to connect, at 12 o'clock, the left-hand fixed structure to the right-hand fixed structure, more particularly the left-hand 12 o'clock beam 206*c* to the right-hand 12 o'clock beam 206*c*.

It is also possible to add one or more movement limiters 231*a* connected to the pylon 16, forming a Y-shaped stop having a certain play corresponding to the displacement that is to be tolerated.

The nacelle 102 as a mobile assembly 207 having a mobile cowl 207*a* forming the walls of the nozzle and a main slider 207*b* in which are integrated the gratings 209 by which it is possible to deflect the flow passing from the inside to the outside. In this case, the main slider 207*b* is in the form of a cylinder having openwork walls. The mobile cowl 207*a* is fixed to and downstream of the main slider 207*b*.

In the embodiment of the disclosure herein presented here, the gratings 209 cover the openwork walls of the main slider 207*b* and the gratings 209 are not shown in FIGS. 5 through 7 in order to be able to show the mechanisms described below. Of course, it is also possible to do without the gratings.

The main slider 207*b* is mounted mobile in translation in a direction of translation that is largely parallel to the longitudinal axis X on the fixed structure 206 of the nacelle 102, and more particularly in this case on the 12 o'clock beam 206*c* and the 6 o'clock beam 206*e*.

The main slider 207*b* is made to translate by systems of slides between the frame 206*b* and the main slider 207*b*.

Figure 8:
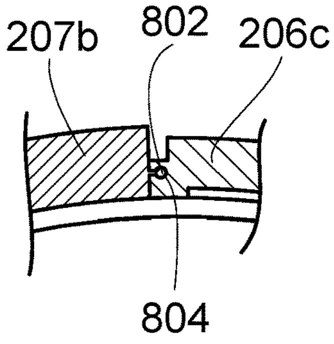
FIG. 8 shows a view in section in plane VIII of FIG. 4.

FIG. 8 shows an example of a particular embodiment of the system of slides between the 12 o'clock beam 206*c* and the main slider 207*b*. This embodiment is applicable to the 9 o'clock and 6 o'clock slide connections. In this embodiment, the main slider 207*b* has a rib 802 in the form of a straight bead, and the 12 o'clock beam 206*c* has a groove 804, the shape of which is suitable to allow the rib 802 to slide.

The main slider 207*b* is mobile between an advanced position (FIGS. 2, 3 and 5) and a retracted position (FIGS. 4, 6 and 7) and vice versa. In the advanced position, the main slider 207*b* is positioned as far forward as possible such that the mobile cowl 207*a* is moved close to the fan casing 206*a*. In the retracted position, the main slider 207*b* is positioned as far aft as possible such that the mobile cowl 207*a* is moved away from the fan casing 206*a*.

In the advanced position, the mobile cowl 207*a* and the fan casing 206*a* extend in line with one another so as to define the outer surface of the duct 202.

In the retracted position, the mobile cowl 207*a* and the fan casing 206*a* are spaced apart from one another and define, between them, an open window 210 between the duct 202 and the outside of the nacelle 102 through one of the gratings 209 of the main slider 207*b*. That is to say that the air from the bypass flow 208 passes through the window 210, passing through one of the gratings 209 of the main slider 207*b*, to end up outside the turbofan 100.

The fan casing 206*a* forms the upstream boundary of the window 210 with respect to the longitudinal axis X, and the mobile cowl 207*a* forms the downstream boundary of the window 210 with respect to the longitudinal axis X. The window 210 is located opposite a grating 209 of the main slider 207*b*.

The nacelle 102 comprises a plurality of reverser flaps 104 distributed over the periphery of the nacelle 102 as a function of the angular opening of the window 210 about the longitudinal axis X.

Each reverser flap 104 is mounted so as to be articulated, on the main slider 207*b*, between a closed position (FIGS. 2, 3, 5 and 6) and an open position (FIGS. 4 and 7), and vice versa.

The closed position can be adopted when the main slider 207*b* is in the advanced position or the retracted position. The open position can be adopted only when the main slider 207*b* is in the retracted position.

In the closed position, each reverser flap 104 obstructs a zone of the openwork portion of the main slider 207*b* when the latter is in the advanced position, and the same zone of the openwork portion of the main slider 207*b* and a zone of the window 210 when the main slider 207*b* is in the retracted position. In the open position, the reverser flap 104 does not obstruct the zone of the window 210, or the openwork portion of the main slider 207*b*, allowing the bypass flow 208 to pass through.

Thus, in the closed position, each reverser flap 104 is generally in line with the mobile cowl 207*a* and, in the open position, each reverser flap 104 is positioned across the duct 202 and deflects at least part of the bypass flow 208 to the outside through the window 210.

In the advanced position, each reverser flap 104 is positioned outside the fan casing 206*a*.

Each reverser flap 104 is articulated to the downstream portion of the main slider 207*b* on hinges 212 fixed to the main slider 207*b* while the opposite free edge is positioned in the upstream direction in the closed position and towards the motor 20 in the open position.

The mobile assembly 207 also has a secondary slider 214 which is mounted mobile in translation in a direction parallel to the direction of translation on the main slider **207*b*. Thus, the secondary slider 214** is mobile between a first position and a second position.

The mobile assembly 207 also has a transmission system 216 which, for each reverser flap 104, takes in this case the form of a link that is articulated at one end to the reverser flap 104 and articulated at the other end to the secondary slider 214. There is therefore one secondary slider 214 for multiple reverser flaps 104.

The transmission system 216 is configured to make each reverser flap 104 pass from the closed position to the open position when the secondary slider 214 passes from the first position to the second position and vice versa.

In the embodiment of the disclosure herein presented here, the first position consists in moving the secondary slider 214 forwards, while the second position consists in moving the secondary slider 214 aft.

The secondary slider 214 is made to translate by systems of slides between the main slider **207*b* and the secondary slider 214, which can for example take the same form as that described in FIG. 8. The secondary slider 214** is guided radially by the intermediary of rollers or blocks.

Figure 9:
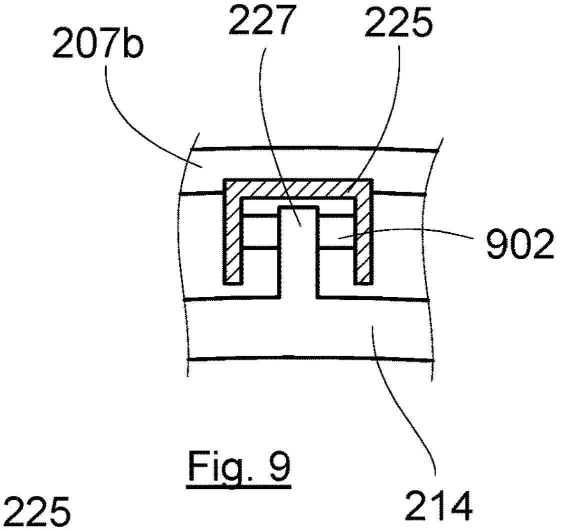
FIG. 9 shows a view in section in plane IX of FIG. 7.

FIG. 9 shows an example of one particular embodiment of the guiding of the secondary slider 214. In this case, the main slider **207*b* has U-shaped profiles 225 which extend parallel to the longitudinal axis X and which are open towards the inside and the secondary slider 214 has a clevis 227 that extends radially into one of the U-shaped profiles 225 and bears blocks or rollers 902 between the clevis 227 and each of the flanks of the U-shaped profile 225**.

Figure 10:
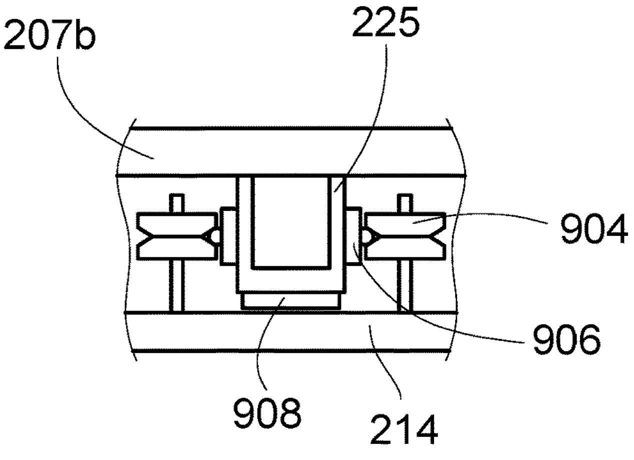
FIG. 10 shows a view similar to that of FIG. 9 for a particular embodiment.

FIG. 10 shows an example of one particular embodiment of the guiding of the secondary slider 214. In this case, the main slider **207*b* has U-shaped profiles 225 which extend parallel to the longitudinal axis X and which are open towards the outside and the secondary slider 214 has two axle+roller assemblies 904, on either side of the main slider 207*b* and fixed to the secondary slider 214. The U-shaped profile 225 (which may have a different shape, for example an I-shape or a T-shape) bears blocks 908 for reacting the radial forces from the secondary slider 214, and rails 906 making it possible to react the forces perpendicular to the radial forces from the secondary slider 214. The combination of the rails 906 and the rollers 904 makes it possible to guide the secondary slider 214** as it translates along the longitudinal axis X.

The passage from the advanced position of the main slider **207*b* to the position in which the main slider 207*b* is retracted and the reverser flaps 104 are open thus consists, from the advanced and closed position, in retracting the main slider 207*b* by translation with respect to the frame 206*b* in order to reach the retracted and closed position, in moving the secondary slider 214 from the first position to the second position in order to make the reverser flaps 104** pass from the closed position to the open position.

The reverse movement makes it possible to return to the advanced position.

The nacelle 102 also comprises an actuation system comprising a plurality of actuators 218 and 220 that bring about the movement in translation of the main slider **207*b* and of the secondary slider 214. Each actuator 218, 220 is controlled by a control unit, for example of the processor type, which controls the movements in one direction or the other according to the requirements of the aircraft 10**.

The actuator system or set of actuators 218, 220 is thus configured to bring about, from the advanced and closed position, a movement in translation of the main slider **207*b* to the retracted position, and then the movement in translation of the secondary slider 214 from the first position to the second position and vice versa. During the movement of the main slider 207*b*, the secondary slider 214 which is borne by the main slider 207*b*** follows the same movement.

Each actuator 218, 220 may for example take the form of a double-action telescopic-stem jack. There are thus multiple jacks, of which each cylinder is fixed to the frame **206*b* and more generally to the fixed structure 206 of the nacelle 102, and of which the end of each one of the first stems is fixed to the main slider 207*b*, and of which the end of each one of the second stems is fixed to the secondary slider 214**.

Each actuator 218, 220 may for example take the form of a double-action jack. Actuators 218 comprise first jacks, each one having a cylinder fixed to the frame **206*b*, and more generally to the fixed structure 206 of the nacelle 102, and a stem fixed to the main slider 207*b*. Actuators 220 comprise second jacks, each one having a cylinder fixed to the main slider 207*b* and a stem fixed to the secondary slider 214**.

Each actuator 218, 220 may for example comprise or take the form of a motor that meshes with a rack. There are thus first motors, each one being fixed to the frame **206*b* and meshing with a rack that is fixed to the main slider 207*b*. There are thus second motors, each one being fixed to the main slider 207*b* and meshing with a rack that is fixed to the secondary slider 214**.

In the embodiment presented here, there are three actuators 218 for each half of the nacelle 102 and for moving the main slider **207*b*, and three actuators 220 for each half of the nacelle 102 and for moving the secondary slider 214**.

The number of actuators 218, 220 is therefore reduced compared to the number of actuators of the prior art, resulting in a saving in terms of weight.

In order to avoid any deformation of the main slider **207*b* during the movement of the secondary slider 214, the main slider 207*b* is pressed against the fixed structure 206 of the nacelle 102 in the retracted position. To that end, the actuators 218 that move the main slider 207*b* move it until it abuts against the fixed structure 206 of the nacelle 102, and hold it in this position until there is a command for the return to the advanced position. Such a placement in abutment makes it possible to temporarily fix the main slider 207*b***.

In the embodiment of the disclosure herein shown here, the main slider **207*b* has stops 222 that are angularly distributed around the perimeter of the main slider 207*b*, and, for each stop 222, the fan casing 206*a* has a counter-stop 224 against which the stop 222** comes to abut in the retracted position.

The disclosure herein has been more particularly described in the case of a nacelle under a wing but can be applied to a nacelle located at the rear of the fuselage.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a”, “an” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan comprising a motor and a nacelle, surrounding the motor, which comprises a fan casing, in which a duct for a bypass flow is disposed between the nacelle and the motor, the nacelle comprising:

a fixed structure attached to the fan casing;

a mobile assembly having a mobile cowl and a main slider bearing gratings, the mobile cowl being fixed to and downstream of the main slider, the main slider being mobile in translation, on the fixed structure, in a direction of translation between an advanced position in which the main slider is positioned such that the mobile cowl is moved close to the fan casing and a retracted position in which the main slider is positioned such that the mobile cowl is moved away from the fan casing so as to define, between them, an open window between the duct for the bypass flow and an outside of the nacelle, through one of the gratings; and a plurality of reverser flaps, each reverser flap mounted articulated on the main slider between a closed position in which the reverser flap obstructs a zone of the window and an open position in which the reverser flap does not obstruct the zone of the window;

a secondary slider mounted mobile in translation parallel to the direction of translation of the main slider between a first position and a second position;

a transmission system configured to make each reverser flap pass from the closed position to the open position when the secondary slider passes from the first position to the second position and vice versa; and an actuator system comprising first actuators comprising a cylinder attached to the fixed structure and a stem fixed to the main slider, and second actuators comprising a cylinder attached to the main slider and a stem attached to the secondary slider, the actuator system configured to bring about, from the advanced and closed positions, a movement in translation of the main slider to the retracted position, and then movement in translation of the secondary slider from the first position to the second position and vice versa.

2. The turbofan according to claim 1, wherein the turbofan is configured such that in the retracted position, the main slider is pressed against the fixed structure of the nacelle.

3. The turbofan according to claim 2, wherein the main slider has stops that are angularly distributed around a perimeter of the main slider, and wherein, for each stop, the fan casing has a counter-stop against which the stop comes to abut in the retracted position.

4. An aircraft comprising at least one turbofan comprising a motor and a nacelle, surrounding the motor, which comprises a fan casing, in which a duct for a bypass flow is disposed between the nacelle and the motor, the nacelle comprising:

a fixed structure attached to the fan casing;

a mobile assembly having a mobile cowl and a main slider bearing gratings, the mobile cowl being fixed to and downstream of the main slider, the main slider being mobile in translation, on the fixed structure, in a direction of translation between an advanced position in which the main slider is positioned such that the mobile cowl is moved close to the fan casing and a retracted position in which the main slider is positioned such that the mobile cowl is moved away from the fan casing so as to define, between them, an open window between the duct for the bypass flow and an outside of the nacelle, through one of the gratings; and a plurality of reverser flaps, each reverser flap mounted articulated on the main slider between a closed position in which the reverser flap obstructs a zone of the window and an open position in which the reverser flap does not obstruct the zone of the window;

a secondary slider mounted mobile in translation parallel to the direction of translation of the main slider between a first position and a second position;

a transmission system configured to make each reverser flap pass from the closed position to the open position when the secondary slider passes from the first position to the second position and vice versa; and an actuator system comprising first actuators comprising a cylinder attached to the fixed structure and a stem fixed to the main slider, and second actuators comprising a cylinder attached to the main slider and a stem attached to the secondary slider, the actuator system configured to bring about, from the advanced and closed positions, a movement in translation of the main slider to the retracted position, and then movement in translation of the secondary slider from the first position to the second position and vice versa.

* * * * *